(12) United States Patent
Oda

(10) Patent No.: US 9,150,358 B2
(45) Date of Patent: Oct. 6, 2015

(54) MAGNET CONVEYANCE POSITIONING DEVICE

(71) Applicant: FANUC CORPORATION, Yamanashi (JP)

(72) Inventor: Masaru Oda, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 14/471,643

(22) Filed: Aug. 28, 2014

(65) Prior Publication Data

US 2015/0060235 A1   Mar. 5, 2015

(30) Foreign Application Priority Data

Aug. 30, 2013   (JP) ................................. 2013-180292

(51) Int. Cl.
*B25J 15/08*   (2006.01)
*B65G 17/00*   (2006.01)

(52) U.S. Cl.
CPC .................................... *B65G 17/005* (2013.01)

(58) Field of Classification Search
CPC ........................... B25J 15/0019; B25J 15/0057
USPC .................. 198/470.1, 474.1, 476.1, 867.14; 294/119.1, 119.4, 165, 207, 214; 901/31, 32, 36
See application file for complete search history.

(56) References Cited

U.S. PATENT DOCUMENTS

| 3,983,926 | A  | * | 10/1976 | Muller ........................... 164/386 |
| 4,355,936 | A  | * | 10/1982 | Thomas et al. ............. 414/796.2 |
| 4,412,293 | A  | * | 10/1983 | Kelley et al. ................... 700/259 |
| 4,472,934 | A  | * | 9/1984  | Kriechbaum et al. .......... 57/275 |
| 5,380,147 | A  | * | 1/1995  | Hess et al. ...................... 414/796 |
| 7,293,352 | B2 | * | 11/2007 | Okuda et al. .................... 29/743 |
| 7,474,939 | B2 | * | 1/2009  | Oda et al. ....................... 700/245 |
| 8,172,292 | B1 | * | 5/2012  | Andersen ....................... 294/207 |
| 8,630,737 | B2 | * | 1/2014  | Oda ............................... 700/259 |

FOREIGN PATENT DOCUMENTS

| JP | 11187627 A    | 7/1999  |
| JP | 11-277345 A   | 10/1999 |
| JP | 2012-240166 A | 12/2012 |

OTHER PUBLICATIONS

English Machine Translation for Japanese Patent Publication No. 11-277345 published Oct. 12, 2011, 8 pages.
English Machine Translation for Japanese Patent Publication No. 2012-240166 published Dec. 10, 2012, 13 pages.

* cited by examiner

*Primary Examiner* — Douglas Hess
(74) *Attorney, Agent, or Firm* — Fredrikson & Byron, P.A.

(57) ABSTRACT

A magnet conveyance positioning device including a conveyance unit and an attachment device attached to the conveyance unit to move integrally with the conveyance unit. The attachment device includes a support unit abutting on a object and supporting the conveyance unit from the object, a holding unit provided movably relative to the support unit to detachably hold the magnet, and a driving unit moving the holding unit so that the magnet approaches the object in a state where the support unit is abutted on the object.

6 Claims, 5 Drawing Sheets

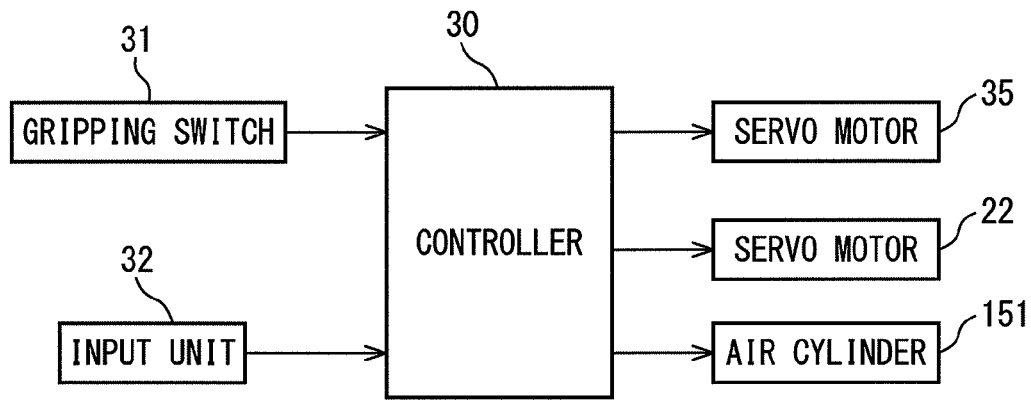
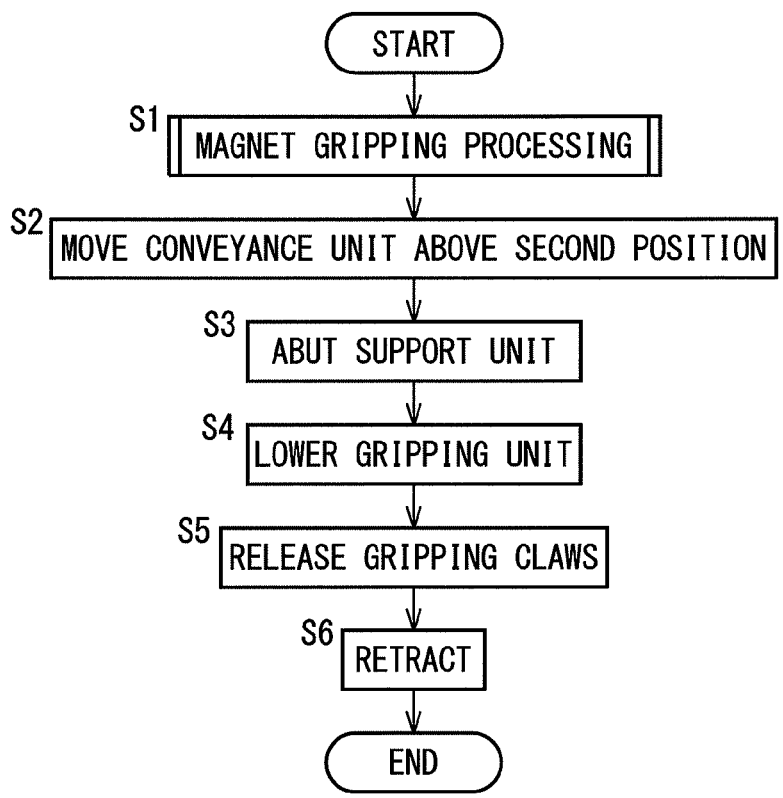

FIG. 5A
FIG. 5B
FIG. 5C
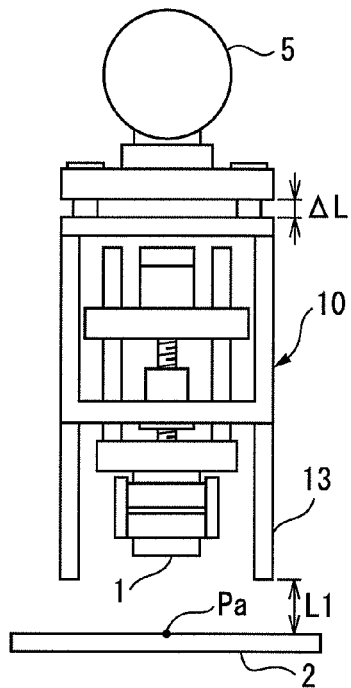
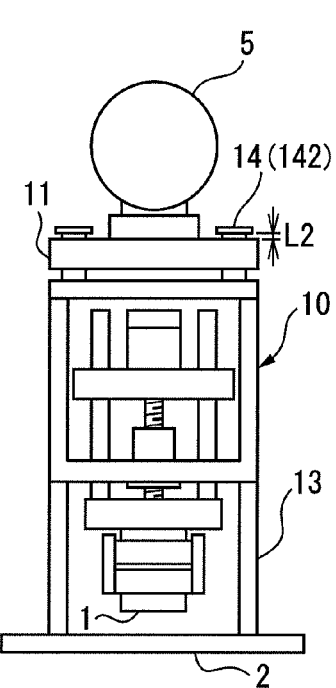
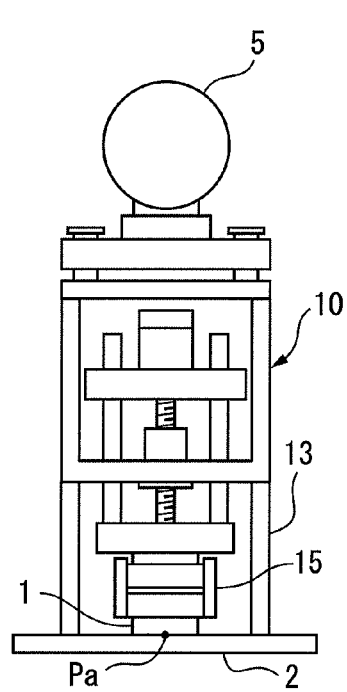
FIG. 5D
FIG. 5E
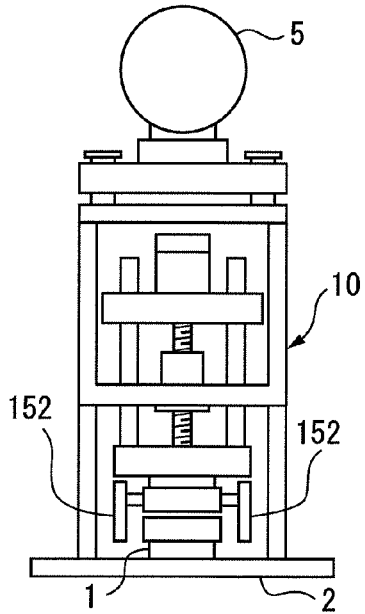
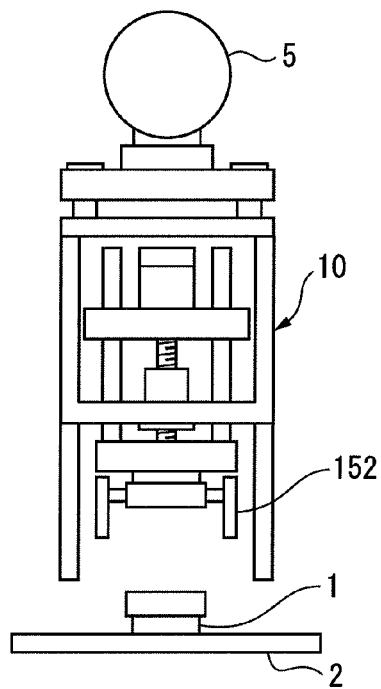

MAGNET CONVEYANCE POSITIONING DEVICE

BACKGROUND OF THE INVENTION

1. Field of the Invention

The present invention relates to a magnet conveyance positioning device that positions and mounts a magnet on an object.

2. Description of the Related Art

Generally, a magnet is manually mounted on an object by using a jig. In order to accurately mount a magnet, for example, Japanese Laid-open Patent Publication No. 11-187627 (JP11-187627A) describes a positioning jig for positioning and mounting the magnet on the object.

However, the configuration that manually mounts the magnet on the object by using the jig, as described in JP11-187627A, requires a lot of labor and time for attaching or detaching the jig, and thus it is difficult to efficiently mount the magnet. On the other hand, in the configuration that conveys the magnet to the object and mounts it on the object by a robot or the like without using any jig or human hands, attraction force between the magnet and the object may cause staggering of an end portion of the robot. Consequently, it is difficult to accurately position the magnet.

SUMMARY OF THE INVENTION

According to an aspect of the present invention, a magnet conveyance positioning device for positioning and mounting a magnet on an object includes a conveyance unit, and an attachment device attached to the conveyance unit to move integrally with the conveyance unit. The attachment device includes a support unit abutting on the object and supporting the conveyance unit from the object, a holding unit provided movably relative to the support unit to detachably hold the magnet, and a driving unit moving the holding unit so that the magnet approaches the object in a state where the support unit is abutted on the object.

BRIEF DESCRIPTION OF THE DRAWINGS

The objects, features and advantages of the present invention will become more apparent from the following description of the embodiments related to the attached drawings, in which:

FIG. 2 is a block diagram illustrating a control configuration of the magnet conveyance positioning device according to the embodiment of the present invention;

FIG. 3 is a flowchart illustrating an example of processing executed by a controller illustrated in FIG. 2;

FIG. 5A is a diagram describing an operation of the magnet conveyance positioning device according to the embodiment of the present invention;

FIG. 5B is a diagram describing an operation sequent to an operation illustrated in FIG. 5A;

FIG. 5C is a diagram describing an operation sequent to the operation illustrated in FIG. 5B;

FIG. 5D is a diagram describing an operation sequent to the operation illustrated in FIG. 5C;

FIG. 5E is a diagram describing an operation sequent to the operation illustrated in FIG. 5D.

DETAILED DESCRIPTION

Figure 1:
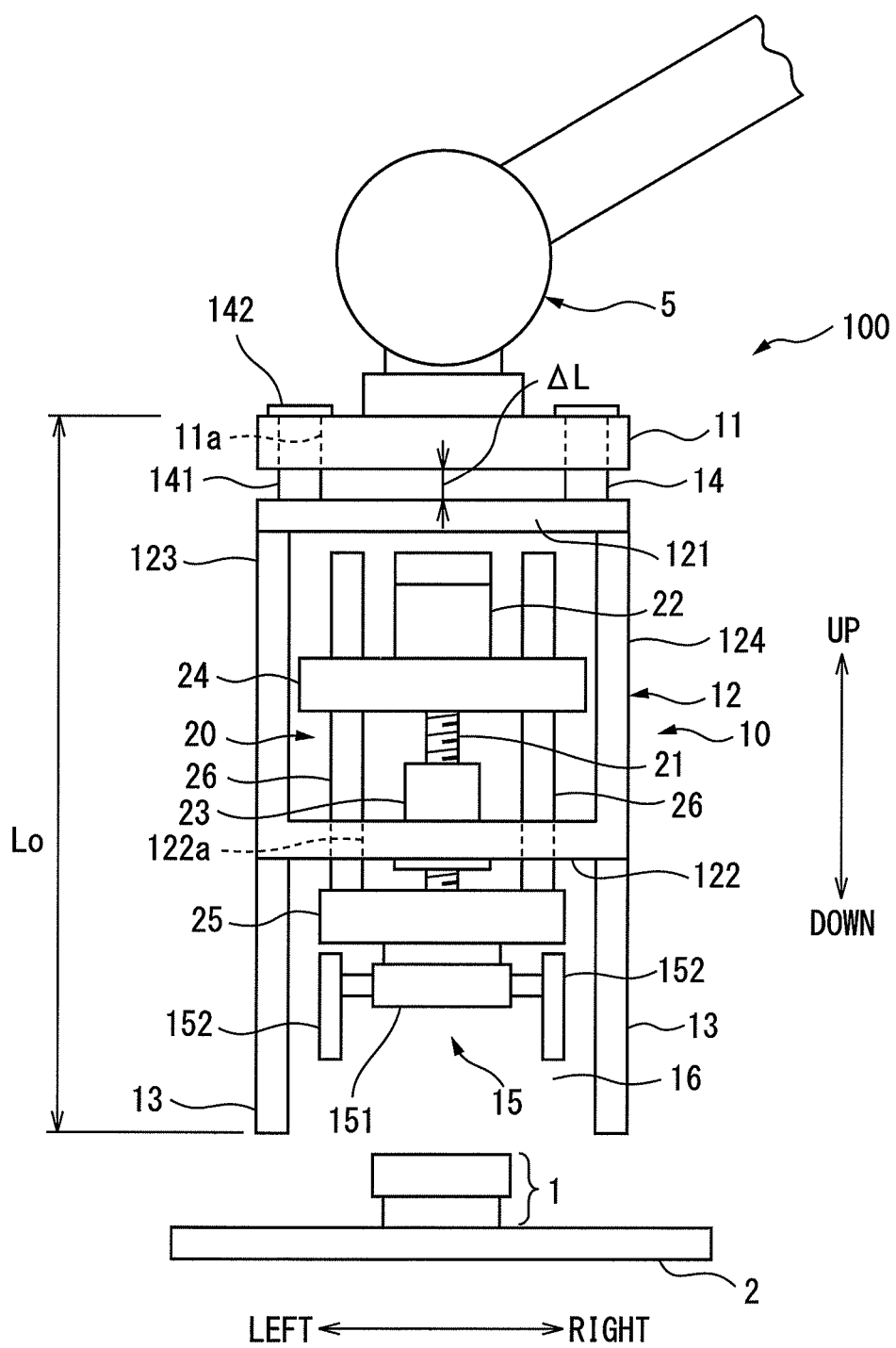
FIG. 1 is a schematic diagram illustrating a configuration of a magnet conveyance positioning device according to an embodiment of the present invention.

Hereinafter, the embodiments of the present invention will be described referring to FIGS. 1 to 6. FIG. 1 is a schematic diagram illustrating a configuration of a magnet conveyance positioning device 100 according to an embodiment of the present invention. The magnet conveyance positioning device 100 is configured to position and mounts a magnet 1 on an object 2. The object 2 is a relatively large magnetic structure such as a rotor of a thermal power generator. In FIG. 1, the magnet 1 is adsorbed on an inner wall surface of the object 2 by its own magnetic force. Hereinafter, for convenience of explanation, an up-and-down direction (vertical direction) and a left-and-right direction (horizontal direction) are defined as illustrated, and a configuration of each unit will be described according to these definitions. In FIG. 1, the object 2 extends in the horizontal direction, and the magnet 1 is mounted on a top surface of the object 2.

As illustrated in FIG. 1, the magnet conveyance positioning device 100 includes a conveyance unit 5 and an attachment device 10 attached to the conveyance unit 5 to move integrally with the conveyance unit 5. The conveyance unit 5 is configured, for example, by a multijoint industrial robot, and the attachment device 10 is attached to an end portion of a robot hand. The conveyance unit 5 is moved by driving a servo motor 35 (illustrated in FIG. 2), and a position and posture of the attachment device 10 are changed to a desired position and posture by the operation of the conveyance unit 5. In FIG. 1, the attachment device 10 is directed downward so as to have a vertical posture.

The attachment device 10 includes a base unit 11 fixed to the conveyance unit 5, a frame unit 12 disposed below the base unit 11, a support unit 13 extending downward from the frame unit 12, a connection unit 14 connecting the base unit 11 and the frame unit 12, a gripping unit 15 for gripping the magnet 1, and an lifting mechanism 20 for lifting the gripping unit 15. The attachment device 10 has a left-and-right symmetrical shape as a whole.

The base unit 11 is a circular or rectangular plate member with a predetermined thickness which extends in the horizontal direction. The conveyance unit 5 is attached to a center part of a top surface of the base unit 11. At both left and right ends of the base unit 11, through-holes 11a with a circular cross section which are penetrated in the up-and-down direction, are opened. The frame unit 12 includes an upper plate 121 and a lower plate 122 extending in the horizontal direction, and a pair of left and right vertical plates 123 and 124 for connecting the upper plate 121 and the lower plate 122, and has a rectangular frame shape as a whole. In the lower plate 122, a pair of left and right guide holes 122a with a circular cross section which are penetrated in the up-and-down direction, are opened. The support unit 13 is a pair of left and right plate members which project downward from both left and right ends of a lower end surface of the lower plate 122.

The connection unit 14 includes a cylindrical unit 141 inserted into the through-hole 11a of the base unit 11, and a stopper 142 provided on an upper end surface of the cylindrical unit 141. The stopper 142 is larger in diameter than the cylindrical unit 141. A lower end surface of the cylindrical unit 141 is fixed to a top surface of the upper plate 121 of the frame unit 12. The cylindrical unit 141 is longer than the plate thickness of the base unit 11 by a predetermined length ΔL, and the base unit 11 is movable in the up-and-down direction along the cylindrical unit 141 within the range of ΔL. In FIG.

1, the frame unit 12 is hung from the base unit 11 via the connection unit 14, and an upper end surface of the base unit 11 abuts on the stopper 142. In this case, a length from the upper end surface of the base unit 11 to a lower end surface of the support unit 13, i.e., a total length of the attachment device 10 is L0.

The gripping unit 15 is disposed between the left side support unit 13 and the right side support unit 13. The gripping unit 15 includes an air cylinder 151 which is expanded and contracted in the left-and-right direction, and a pair of left and right gripping claws 152 attached to the lend portion of the air cylinder 151. It is possible to grip the magnet 1 with the pair of gripping claws 152 by elongating and contracting the air cylinder 151. The gripping claw 152 is configured by a nonmagnetic material such as stainless steel. The units (frame unit 12, support unit 13, and the like) other than the gripping claw 152 can be configured by magnetic materials such as iron, because they are arranged away from the magnet 1 and attraction force from the magnet 1 is small.

The lifting mechanism 20 includes a ball screw 21, a servo motor 22 for driving the ball screw 21 rotationally, a nut 23 engaged with the ball screw 21, a pair of upper and lower lifting plates 24 and 25 connected to an upper end and a lower end of the ball screw 21, and a pair of left and right rods 26 which move in the up-and-down direction along the guide holes 122a of the lower plate 122 of the frame unit 12. The nut 23 is fixed to the lower plate 122 of the frame unit 12. The air cylinder 151 is mounted on a lower end surface of the lifting plate 25, and lower ends of the rods 26 are fixed to both left and right ends of the lifting plate 25.

When rotating the ball screw 21 by driving the servo motor 22, the ball screw 21 move in the up and down direction and the gripping unit 15 lifts integrally with the lifting plate 25 in a space 16 between the left and right support plates 13. At this time, the left and right rods 26 move in the up-and-down direction along the guide holes 122a, and accordingly the lifting plate 25 can be lifted while its horizontal posture is maintained.

The magnet conveyance positioning device 100 according to the embodiment of the present invention automatically conveys the magnet 1 disposed in a parts storage or the like (first position) to the object 2, and automatically attaches the magnet 1 to a predetermined position (second position) of the object 2. FIG. 2 is a block diagram illustrating a control configuration of the magnet conveyance positioning device 100 according to the embodiment of the present invention. A controller 30 is configured by including an arithmetic processing unit that includes a central processing unit (CPU), a read-only memory (ROM), a random access memory (RAM), and other peripheral circuits. A gripping switch 31 for detecting presence of gripping of the magnet 1 by the gripping claws 152 and an input unit 32 configured to input a conveyance start command or the like of the magnet 1 are connected to the controller 30.

In a memory of the controller 30, the first position in which the magnet 1 is disposed, the second position to which the magnet 1 is fitted, the total length L0 of the attachment device 10, and the like, are stored in advance. The controller 30 executes predetermined processing based on signals from the gripping switch 31 and the input unit 32 and various kinds of information stored in the memory, and outputs control signals to the robot driving servo motor 35, and the servo motor 22 and the air cylinder 151 provided in the attachment device 10.

FIG. 3 is a flowchart illustrating an example of processing executed by the controller 30. The processing illustrated in the flowchart is started, for example, when a conveyance start command of the magnet 1 is input from the input unit 32. In an initial state, the gripping unit 15 is raised at maximum, and the air cylinder 151 is elongated at maximum. In step S1, magnet gripping processing for gripping the magnet 1 disposed in the parts storage is performed.

Figure 4:
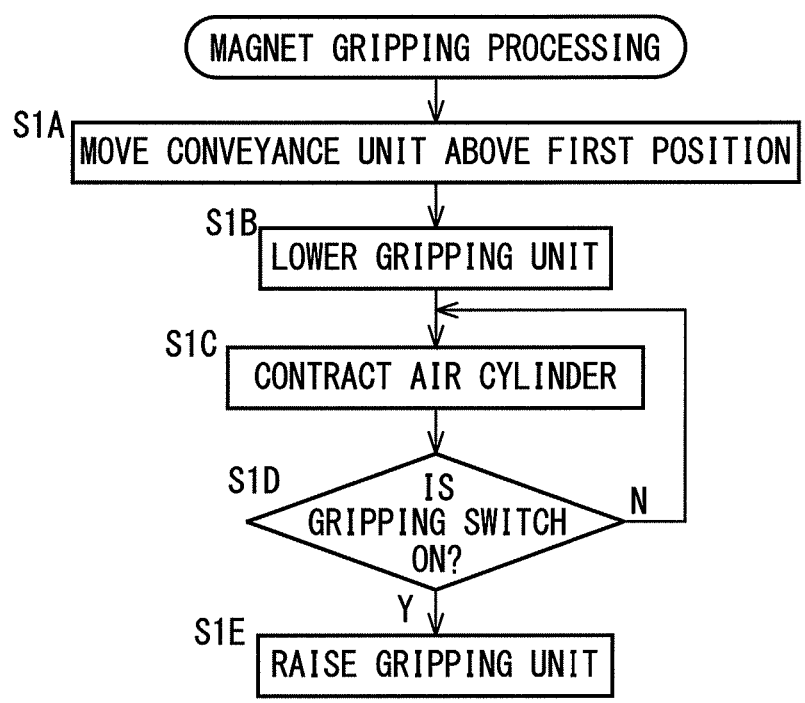
FIG. 4 is a flowchart illustrating a specific processing content of magnet gripping processing illustrated in FIG. 3.

FIG. 4 is a flowchart illustrating a specific content of the magnet gripping processing. In step S1A, a control signal is output to the robot driving servo motor 35 based on the information stored in the memory in advance to move the attachment device 10 above the first position. In step SIB, a control signal is output to the servo motor 22 to lower the gripping unit 15 toward the magnet 1. In step SIC, a control signal is output to the air cylinder 151, and the air cylinder 151 is contracted to shorten a distance between the pair of gripping claws 152. In step S1D, whether or not the gripping switch 31 is on, i.e., whether or not the magnet 1 has been gripped by the gripping claws 152, is determined. When a positive decision is made at step S1D, the processing proceeds to step S1E, and a control signal is output to the servo motor 22 to raise the gripping unit 15.

After the above magnet gripping processing ends, the processing proceeds to step S2 illustrated in FIG. 3. In step S2, a control signal is output to the servo motor 35 based on the information stored in the memory in advance to move the attachment device 10 above the second position while gripping the magnet 1. In other words, as illustrated in FIG. 5A, the conveyance unit 5 is moved in view of the total length L0 of the attachment device 10 so that a center of the attachment device 10 is positioned above a second position Pa on the top surface of the object 2, for example, the lower end surface of the support unit 13 is positioned above the object 2 by a predetermined amount L1.

Then, in step S3, a control signal is output to the servo motor 35 to lower the attachment device 10, and the lower end surface of the support unit 13 abuts on the top surface of the object 2. In this case, if the attachment device 10 is lowered by the predetermined amount L1, the lower end surface of the support unit 13 abuts on the top surface of the object 2. However, in this embodiment, a lowering amount of the attachment device 10 is set to larger than L1 by a predetermined amount L2 (<ΔL) so that a sufficient pressing force from the support unit 13 acts on the object 2. Therefore, as illustrated in FIG. 5B, the top surface of the base unit 11 is positioned below the stopper 142 of the connection unit 14 by the predetermined amount L2. In a state illustrated in FIG. 5B, the magnet 1 is sufficiently away from the object 2. Thus, attraction force between the magnet 1 and the object 2 is small, and position setting of the conveyance unit 5 is easy.

Then, in step S4, a control signal is output to the servo motor 22 to lower the gripping unit 15 to adsorb the magnet 1 on the second position Pa of the top surface of the object 2. When the magnet 1 approaches the object 2, the attraction force between the magnet 1 and the object 2 increases. In this state, as illustrated in FIG. 5C, the conveyance unit 5 is supported by the object 2 via the support unit 13. In other words, the support unit 13 regulates a position of the conveyance unit 5 with respect to the object 2. Therefore, it is possible to prevent the conveyance unit 5 from being pulled toward the object 2 side by the attraction force, and the magnet 1 can be accurately positioned and mounted on the top surface of the object 2. On the other hand, without the support unit 13, the position and the posture of the conveyance unit 5 are made unstable due to the attraction force between the magnet 1 and the object 2, and it is difficult to accurately position the magnet 1.

Then, in step S5, a control signal is output to the air cylinder 151 to release the gripping claws 152. Therefore, as illustrated in FIG. 5D, the gripping claws 152 move away from the magnet 1 and the magnet 1 is held on the top surface of the object 2 by its own magnet force. In this case, since the gripping claws 152 are configured by a nonmagnetic material, the gripping claws 152 can be easily separated from the magnet 1.

Finally, in step S6, a control signal is output to the servo motor 22 to raise the gripping unit 15, and a control signal is output to the servo motor 35 to raise the attachment device 10. Therefore, as illustrated in FIG. 5E, the attachment device 10 retracts from the object 2, and the fitting of the magnet 1 to the object 2 is completed.

In this embodiment, the following operational effects can be achieved.

(1) The magnet conveyance positioning device 100 includes the conveyance unit 5 and the attachment device 10 attached to the conveyance unit 5. The attachment device 10 includes the support unit 13 which abuts on the object 2 and supports the conveyance unit 5 from the object 2, the gripping unit 15 provided movably relative to the support unit 13 to detachably hold the magnet 1, and the lifting mechanism 20 for lifting the gripping unit 15 so that the magnet 1 approaches the object 2 in a state where the support unit 13 is abutted on the object 2. Therefore, it is possible to prevent the conveyance unit 5 from being pulled toward the object 2 side by the attraction force between the magnet 1 and the object 2 when the magnet 1 is attached to the object 2, and to accurately position and mount the magnet 1 on the object 2.

(2) The connection unit 14 is provided between the base unit 11 and the frame unit 12 so that the support unit 13 is movable within the predetermined range ΔL in a predetermined direction (extending direction of support unit 13) relative to the base unit 11. Therefore, it is possible to reduce shock when the support unit 13 abuts on the object 2.

(3) When the conveyance unit 5 is configured by a general-purpose robot, automatic conveyance of the magnet 1 can be easily and inexpensively performed.

(4) As the lifting mechanism 20, the ball screw 21 is driven by the servo motor 22 to lift the gripping unit 15. Thus, an approach speed of the magnet 1 to the object 2 can be finely controlled. Accordingly, the magnet 1 can be slowly attached to the object 2, and shocks during fitting (adsorption) of the magnet 1 can be reduced.

(5) The servo motor 22 of the lifting mechanism 20 and the robot driving servo motor 35 are controlled by the same controller 30. Thus, the robot and the lifting mechanism 20 can be easily controlled in synchronization, and the magnet 1 can be efficiently attached to the object 2.

In the above embodiment, the magnet 1 is configured to be gripped by the gripping unit 15. However, any configuration of a holding unit can be employed as long as the holding unit is provided movably relative to the support unit 13 and detachably holds the magnet 1. In the above embodiment, the gripping unit 15 is configured to be lifted by the servo motor 22. However, any configuration of a driving unit can be employed as long as the driving unit moves the holding unit (gripping unit 15) so that the magnet 1 approaches the object 2 in a state where the support unit 13 is abutted on the object 2.

Figure 6:
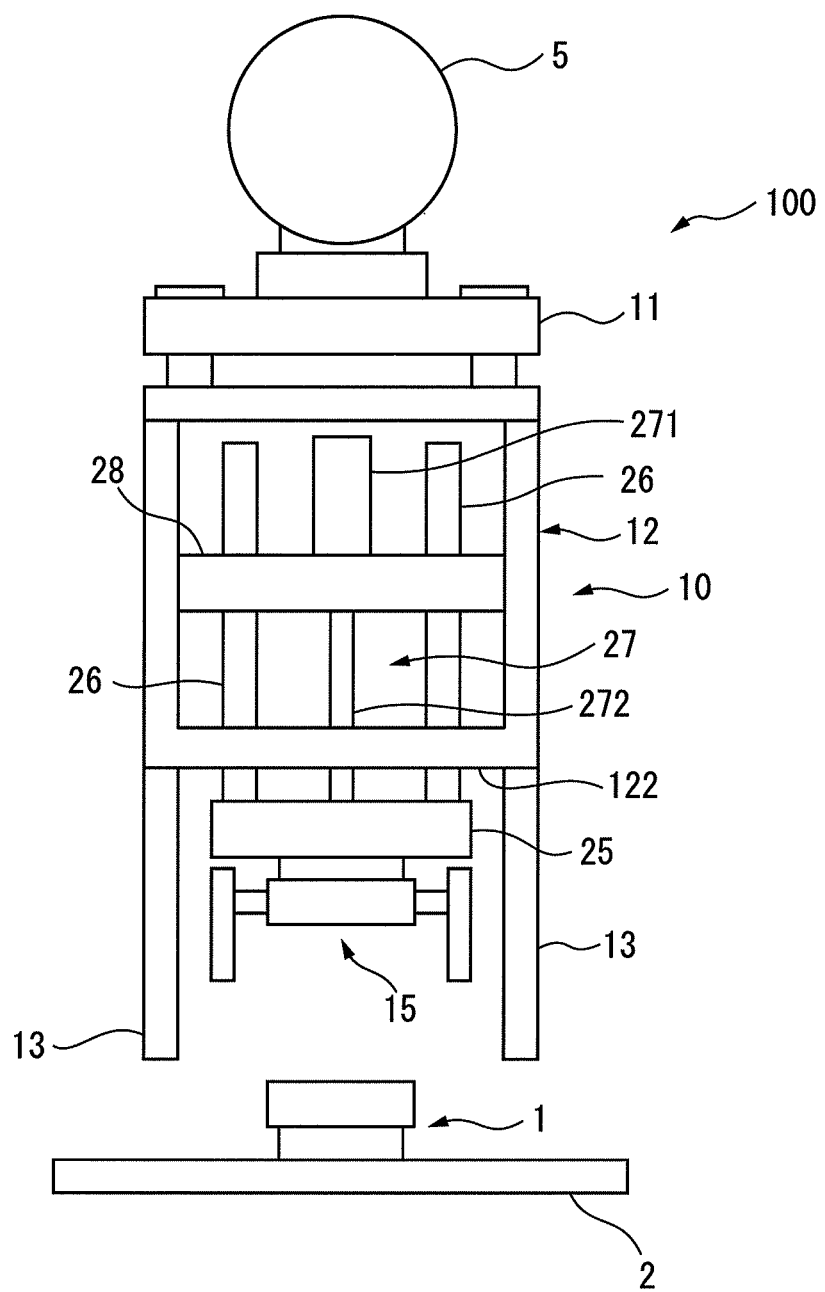
FIG. 6 is a diagram illustrating a modified example of the magnet conveyance positioning device illustrated in FIG. 1.

FIG. 6 illustrates an example of using an air cylinder 27 as a driving unit in place of the servo motor 22. The air cylinder 27 includes a cylinder tube 271 and a cylinder rod 272 which is expanded and contracted from the cylinder tube 271. A plate 28 is fixed inside a frame unit 12, and the cylinder tube 271 is supported on a top surface of the plate 28. The cylinder rod 272 penetrates the plate 28 and a lower plate 122, and a lifting plate 25 is attached to the end portion of the cylinder rod 272. When the air cylinder 27 expands and contracts, a gripping unit 15 is lifted. Therefore, it is possible to attach a magnet 1 to an object 2 in a state where a support unit 13 is abutted on the object 2. Thus, when the driving unit is configured by the air cylinder 27, the configuration can be simplified and made inexpensive.

In the above embodiment, the connection unit 14 is provided in the attachment device 10, so that the support unit 13 is securely abutted on the object 2. However, a configuration of a movement permission unit is not limited hereto as long as the movement permission unit is provided between the conveyance unit 5 and the support unit 13 and the movement of the conveyance unit 5 is permitted in a state where the support unit 13 is abutted on the object 2. The connection unit 14 may be omitted, and presence of abutment of the support unit 13 may be detected by a contact detector, a load detector, or the like. In the above embodiment, the conveyance unit 5 is configured by the robot. However, a configuration of the conveyance unit is not necessarily limited hereto. In the above embodiment, the servo motor 22 (first servo motor) of the lifting mechanism 20 and the robot driving servo motor 35 (second servo motor) are controlled by the same controller 30 (control unit). However, these motors may be controlled by separate control units.

The above embodiment and one or a plurality of modified examples may be arbitrarily combined.

According to the present invention, the support unit which abuts on the object and supports the conveyance unit from the object is provided, and the magnet approaches the object in a state where the support unit is abutted on the object. Thus, it is possible to prevent the conveyance unit from being pulled toward the object side by the attraction force between the magnet and the object when the magnet is attached to the object, and to accurately position and attach the magnet to the object.

While the present invention has been described with reference to the preferred embodiments thereof, it will be understood, by those skilled in the art, that various modifications and changes may be made thereto without departing from the scope of the appended claims.

The invention claimed is:

1. A magnet conveyance positioning device for positioning and mounting a magnet on an object, comprising:
   a conveyance unit; and
   an attachment device attached to the conveyance unit to move integrally with the conveyance unit, wherein the attachment device comprises:
      a support unit moveable into an abutting position on the object wherein the support unit supports the conveyance unit from the object;
      a holding unit provided within the support unit and independently movable relative to the support unit to detachably hold the magnet; and
      a driving unit operatively coupled to the holding unit to move the holding unit so that the magnet approaches the object when the support unit is abutted on the object.

2. The magnet conveyance positioning device according to claim 1, wherein the attachment device further comprises a movement permission unit provided between the conveyance unit and the support unit to permit a movement of the conveyance unit when the support unit abuts the object.

3. The magnet conveyance positioning device according to claim 1, wherein the conveyance unit is a robot.

4. The magnet conveyance positioning device according to claim 3, wherein the driving unit is a first servo motor, wherein the magnet conveyance positioning device further comprises:
   a second motor for driving the robot; and
   a control unit controlling the first servo motor and the second servo motor.

5. The magnet conveyance positioning device according to claim 1, wherein the driving unit is a servo motor.

6. The magnet conveyance positioning device according to claim 1, wherein the driving unit is an air cylinder.

* * * * *